US012254721B2

(12) United States Patent
Crone

(10) Patent No.: US 12,254,721 B2
(45) Date of Patent: Mar. 18, 2025

(54) ROBOTIC VEHICLE INSPECTION

(71) Applicant: UNITED STATES POSTAL SERVICE, Washington, DC (US)

(72) Inventor: Donald E. Crone, Frederick, MD (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 817 days.

(21) Appl. No.: 17/474,252

(22) Filed: Sep. 14, 2021

(65) Prior Publication Data

US 2022/0084325 A1 Mar. 17, 2022

Related U.S. Application Data

(60) Provisional application No. 63/078,592, filed on Sep. 15, 2020.

(51) Int. Cl.
*G07C 5/08* (2006.01)
*B25J 11/00* (2006.01)
(Continued)

(52) U.S. Cl.
CPC ............ *G07C 5/008* (2013.01); *B25J 11/008* (2013.01); *B25J 19/023* (2013.01); *G06N 20/00* (2019.01);
(Continued)

(58) Field of Classification Search
CPC ...... G07C 5/008; G07C 5/006; G07C 5/0808; B25J 11/008; B25J 19/023; G06N 20/00; G06Q 10/20; G06T 7/0004; G06T 2207/20081; G06T 2207/30252; G06T 2207/20084; G06T 7/001; G06V 20/10; G06V 2201/08; G06V 20/194; G06V 20/52
See application file for complete search history.

(56) References Cited

U.S. PATENT DOCUMENTS

| 7,896,113 B1* | 3/2011 | Ramirez | ............ G05D 1/0038 |
| | | | 180/9 |
| 2008/0179115 A1* | 7/2008 | Ohm | .................... B62D 55/075 |
| | | | 901/1 |

(Continued)

FOREIGN PATENT DOCUMENTS

DE 102019209446 A1 * 12/2020

*Primary Examiner* — Harry Y Oh
(74) *Attorney, Agent, or Firm* — MH2 Technology Law Group, LLP

(57) ABSTRACT

Techniques for inspecting a vehicle using a robot and a home base configured to be situated on a vehicle lot are presented. The robot has a vertical dimension that permits the robot to pass under a vehicle on the vehicle lot. The robot includes at least one sensor and is configured to perform actions including: receiving charging at the home base; traversing a distance from the home base to a vehicle present on the vehicle lot; determining an identification of the vehicle; passing under the vehicle; and obtaining sensor data regarding the vehicle. A computer in communication with the robot is configured to perform actions including: receiving the identification of the vehicle and the sensor data from the robot; analyzing the sensor data based on at least comparison data; determining, based on the analyzing, to send an alert regarding the vehicle; and sending the alert regarding the vehicle.

30 Claims, 4 Drawing Sheets

(51) Int. Cl.
*B25J 19/02* (2006.01)
*G06N 20/00* (2019.01)
*G06Q 10/20* (2023.01)
*G06T 7/00* (2017.01)
*G06V 20/10* (2022.01)
*G07C 5/00* (2006.01)

(52) U.S. Cl.
CPC ........... *G06Q 10/20* (2013.01); *G06T 7/0004* (2013.01); *G06V 20/10* (2022.01); *G07C 5/006* (2013.01); *G07C 5/0808* (2013.01); *G06T 2207/20081* (2013.01); *G06T 2207/30252* (2013.01); *G06V 2201/08* (2022.01)

(56) References Cited

U.S. PATENT DOCUMENTS

| | | | |
|---|---|---|---|
| 2016/0090132 A1* | 3/2016 | Ramsey | G01V 8/10 348/148 |
| 2019/0168391 A1* | 6/2019 | Ohm | B25J 15/0028 |
| 2021/0157313 A1* | 5/2021 | Graf | B62D 53/02 |

* cited by examiner

ROBOTIC VEHICLE INSPECTION

RELATED APPLICATION

The present application claims priority to, and the benefit of, U.S. Provisional Patent Application No. 63/078,592 entitled "Robotic Vehicle Inspection" and filed Sep. 15, 2020, which is hereby incorporated by reference in its entirety.

FIELD

This disclosure relates generally to vehicle maintenance and analytics.

BACKGROUND

Entities with fleets of vehicles face challenges in maintaining, analyzing, and improving the performance of their vehicles. Manually inspecting vehicles for damage or maintenance issues is prohibitively expensive to perform on a daily basis. Further, gathering, assembling, and analyzing data to identify issues that may be present fleet-wide is costly and slow when performed manually.

Known techniques for partially automated vehicle inspection include the use of fixed camera installations that vehicles must drive past. Such installations are generally built into existing structures such as vehicular lots. As such, these types of vehicular inspection installations are difficult to maintain and expensive to upgrade.

SUMMARY

According to various embodiments, a system for inspecting a vehicle is disclosed. The system includes: a home base configured to be situated on a vehicle lot; a robot having a vertical dimension that permits the robot to pass under a vehicle on the vehicle lot, the robot including at least one sensor, the robot configured to perform actions including: receiving charging at the home base; traversing a distance from the home base to a vehicle present on the vehicle lot; determining an identification of the vehicle; passing under the vehicle; and obtaining sensor data regarding the vehicle; and a computer configured to perform operations including: receiving the identification of the vehicle and the sensor data from the robot; analyzing the sensor data based on at least comparison data; determining, based on the analyzing, to send an alert regarding the vehicle; and sending the alert regarding the vehicle.

Various optional features of the above embodiments include the following. The at least one sensor may include at least one of: a camera, a carbon monoxide sensor, a naphtha sensor, a diesel sensor, or a gasoline sensor. The at least one sensor may include at least one camera, where at least one camera is configured to capture at least one image of a ground surface beneath the vehicle, and where the sensor data includes at least one image of a ground surface beneath the vehicle. The at least one sensor may include at least one camera, where at least one camera is configured to capture at least one image of an underside portion of the vehicle, and where the sensor data includes at least one image of an underside portion of the vehicle. The comparison data may include at least one prior image of at least a portion of the vehicle. The comparison data may include at least one image of at least a portion of at least another vehicle. The comparison data may include data derived from at least one technical drawing. The analyzing may include submitting the sensor data to a machine learning classifier trained using at least the comparison data. The comparison data may include data regarding the vehicle, and the analyzing may include detecting a change between the comparison data and the sensor data beyond a predetermined change tolerance. The obtaining sensor data regarding the vehicle may include obtaining sensor data regarding a portion of the vehicle that has identified as potentially having an issue based on robotic analysis of a plurality of vehicles of a same type as the vehicle. The robot may be further configured to retrieve vehicle data from an onboard computer of the vehicle, and where the computer may be further configured to receive the vehicle data from the robot. The sensor data may include at least one of temperature data, emissions data, self-diagnostic data, location data, start data, stop data, video feed data, lidar data, vehicle geometry data, or fuel economy data. The sending the alert may include at least one of sending a text message or sending an email. The alert may include the sensor data. The robot may be is further configured to return to the home base.

According to various embodiments, a method of robotically inspecting a vehicle is presented. The method includes: receiving charging, by a robot, at a home base on a vehicle lot, the robot having a vertical dimension that permits the robot to pass under a vehicle on the vehicle lot, the robot including at least one sensor; traversing a distance, by the robot, from the home base to a vehicle present on the vehicle lot; determining, by the robot, an identification of the vehicle; passing, by the robot, under the vehicle; obtaining, by the robot, sensor data regarding the vehicle; receiving, by a computer communicatively coupled to the robot and from the robot, the identification of the vehicle and the sensor data; analyzing, by the computer, the sensor data based on at least comparison data; determining, by the computer and based on the analyzing, to send an alert regarding the vehicle; and sending the alert regarding the vehicle.

Various optional features of the above embodiments include the following. The at least one sensor may include at least one of: a camera, a carbon monoxide sensor, a naphtha sensor, a diesel sensor, or a gasoline sensor. The at least one sensor may include at least one camera, where at least one camera is configured to capture at least one image of a ground surface beneath the vehicle, and where the sensor data includes at least one image of a ground surface beneath the vehicle. The at least one sensor may include at least one camera, where at least one camera is configured to capture at least one image of an underside portion of the vehicle, and where the sensor data includes at least one image of an underside portion of the vehicle. The comparison data may include at least one prior image of at least a portion of the vehicle. The comparison data may include at least one image of at least a portion of at least another vehicle. The comparison data may include data derived from at least one technical drawing. The analyzing may include submitting the sensor data to a machine learning classifier trained using at least the comparison data. The comparison data may include data regarding the vehicle, and the analyzing may include detecting a change between the comparison data and the sensor data beyond a predetermined change tolerance. The obtaining sensor data regarding the vehicle may include obtaining sensor data regarding a portion of the vehicle that has identified as potentially having an issue based on robotic analysis of a plurality of vehicles of a same type as the vehicle. The method may further include: retrieving, by the robot, retrieve vehicle data from an onboard computer of the vehicle; and receiving, by the computer and from the robot, the vehicle data. The sensor data may include at least one of temperature data, emissions data, self-diagnostic data, location data, start data, stop data, video feed data, lidar data, vehicle geometry data, or fuel economy data. The sending the alert may include at least one of sending a text message or sending an email. The alert may include the sensor data. The robot may be further configured to return to the home base.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
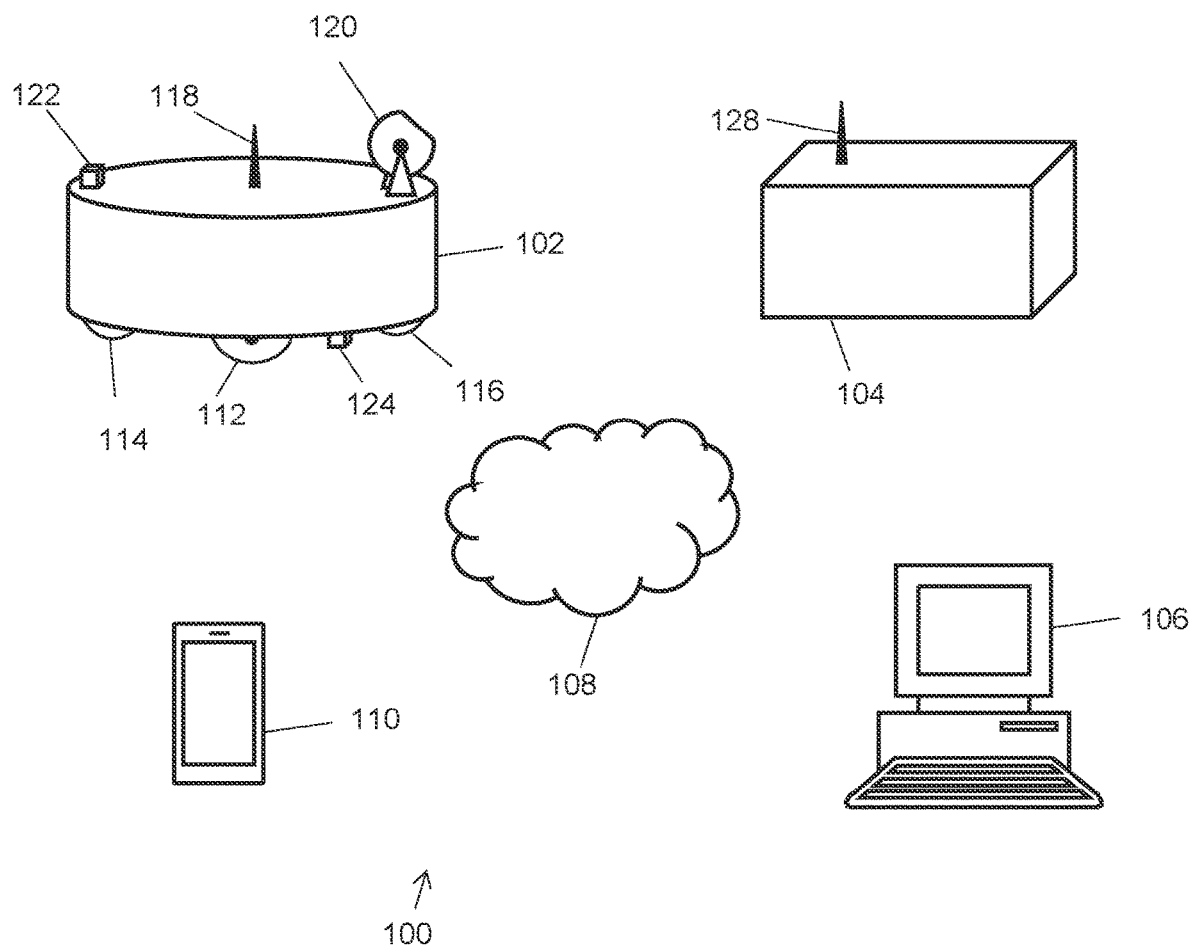
FIG. 1 is a schematic diagram of a robotic vehicular inspection system according to various embodiments.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments provide a robotic system and method for automatically inspecting vehicles. The disclosed techniques may be deployed anywhere, e.g., on any existing vehicle lot. Embodiments may utilize one or more small mobile robots that are capable of traversing the vehicle lot and individually inspecting multiple vehicles. The robots may be dimensioned to easily pass under the vehicles that they are inspecting.

The robots may be outfitted with one or more cameras (e.g., still and/or video cameras) that are configured to capture images of the vehicles and their environment. For example, the robots may include a camera directed at the ground in order to detect fluid leaks and the like and a camera directed up in order to detect issues appearing on the underside of the vehicles, e.g., on their undercarriages, suspensions, exhaust systems, or drivetrains. Alternately, or in addition, the robots may include one or more cameras with movable fields of view, e.g., point-tilt-zoom cameras, which may be controlled to obtain images of the ground and of the vehicle's underside.

The robots may compare captured images of the vehicles to various types of comparison images in order to detect changes that may indicate damage, maintenance requirements, or other issues. The comparison images used to compare with images of a particular vehicle may be obtained from various sources, such as prior images of that particular vehicle, images of similar vehicles (e.g., vehicles in the same fleet that are of the same make, model, and/or year), and/or images generated from blueprints or Computer Aided Drawing (CAD) files. Note that the comparison data may be baseline data, representing a normal condition, or may be fault data, representing a potential or actual problem condition. The comparison may be accomplished using any of a variety of techniques, such as image registration and difference detection and/or machine learning.

In addition to cameras, the robots may include a variety of sensors through which they can detect damage, maintenance, or other issues. For example, the robots may be equipped with visible light cameras, infrared cameras, ultraviolet cameras, LIDAR, moisture sensors, remote temperature sensors, gasoline sensors, naphtha sensors, carbon monoxide sensors, carbon dioxide sensors, and/or diesel sensors.

The robots may gather a variety of data regarding a plurality of fleet vehicles and use such data to identify actual or potential maintenance concerns and other issues that may affect vehicles throughout the fleet. The system may inform its robots to specifically inspect fleet vehicles for the identified maintenance concerns or other issues.

The robots may further interface with the vehicular computers of vehicles that are so equipped to obtain some or all of the data that the vehicle itself collects and maintains. Such data may include distances travelled, fuel economy, emissions data, start/stop times, maximum speed, etc.

The robots may be in communication with a back end system that receives image or other information from the robots and performs image processing, machine learning classification, or other analytics. In this manner, the data obtained by the robots may be processed using virtually unlimited computer processing power available in a back end system. Once an issue is identified, the back end system may send one or more alerts to interested individuals, such as lot chiefs and/or vehicular maintenance personnel. According to some embodiments, the system may restrict use of the vehicle, e.g., restricting its travel distance or speed, or disabling it completely.

The robots may be easily maintained and upgraded. For example, the robots may be small enough to be physically picked up and removed to a maintenance facility. Further, the software for the both the robots and back end system may be upgraded while the system is installed.

These and other features and advantages are described in detail presently.

FIG. 1 is a schematic diagram of a robotic vehicular inspection system 100 according to various embodiments. System 100 includes one or more robots such as robot 102, home base 104, and back end system 106. Robot 102 and/or home base 104 may communicate with back end system 106 via a network, such as the internet 108.

Robot 102 may be of various configurations. Robot 104 may be mobile, having wheels, treads, or other impelling mechanisms. As shown, robot 102 has wheels 112, 114, 116, and, not shown, a wheel corresponding to wheel 112 disposed on the opposite side. Whatever mobilization mechanism, robot 102 is capable of moving forward and backward, turning right and left, and possibly turning on its axis.

Robot 102 further includes one or more cameras, such as camera 120. As shown, camera 120 can point, tilt, and zoom, such that it is able to capture images of the ground below robot 102 and of anything above robot 102 by appropriately tilting. Alternately, robot 102 may have multiple fixed cameras, or even multiple point-tilt-zoom cameras. Any or all of these cameras may be capable of capturing images in the visible spectrum, in the infrared spectrum, or the ultraviolet spectrum in any combination. Robot 102 may include various light sources disposed to illuminate areas captured by its cameras. Such light sources may include visible light, infrared light, and/or ultraviolet light. The light sources may be implemented as high-intensity light emitting diodes according to various embodiments.

Robot 102 may have any of a variety of additional sensors, such as sensors 122, 124. Either or both of sensors 122, 124 may be any of a vapor sensor (e.g., gasoline, naphtha, diesel, water), a gas sensor (e.g., carbon dioxide, carbon monoxide), and/or a temperature sensor (e.g., a remote temperature sensor). Note that any, or a combination of multiple such sensors, may be disposed on top of, under, or on a side of robot 102.

Robot 102 further includes processing circuitry including at least one electronic processor and memory such as is found on a typical personal laptop computer. Thus, robot 102 may include an electronic processor communicatively coupled to persistent electronic storage that includes instructions for performing operations as discussed herein. Thus, the processing circuitry may be configured by software, firmware, and/or hardware to perform the methods disclosed herein, e.g., method 300 as shown and described below in reference to FIG. 3. Robot 102 further includes at least one communications interface, such as a wireless interface (e.g., Wi-Fi interface, Bluetooth interface) and/or wired interface (e.g., USB-C, custom self-aligning magnetic interface having a plurality of electrical contacts for connecting with home base 104). Any wireless communications interfaces may send and receive signals by way of antenna 118.

Home base 104 may serve as a communications point and charging station for robot 102. Home base 104 may thus be physically present on the same vehicle lot as one or more robots with which it connects. More particularly, home base 104 be disposed on a vehicle lot at a location that is out of the way of the vehicles, but from which robot 102 may access the vehicles. Home base 104 may include a wireless and/or wired interface capable of communicating with the processing circuitry of robot 102 through a corresponding interface of robot 102. Home base 104 thus includes antenna 128 for its wireless interface and/or a wired interface for connecting to robot 102. The wired interface may utilize a self-aligning magnetic interface having a plurality of electrical contacts for electrically and communicatively coupling home base 104 and robot 102. According to some embodiments, robot 102 interfaces with home base 104 wirelessly or via a wired connection, and home base 104 communicates with back end system 106 wirelessly or via a wired connection.

Back end system 106 is communicatively coupled to home base 104 via the internet 108. Back end system 106 may be located anywhere on the planet that can communicatively connect with home base 104 via the internet. Back end system 106 includes at least one computer server configured to send and receive data with home base 104. Thus, back end system 106 may be implemented as a server, server farm, or in a cloud computing environment according to various embodiments. Further, back end system 106 may implement pattern matching techniques for still images and video images, described in detail below in reference to FIG. 4. Yet further, back end system 106 may implement one or more computer learning classifiers, described in detail below in reference to FIG. 4. Via the internet 108 or another communication channel such as a cellular communication channel, back end system 106 communicates with computing device 110. For example, back end system 106 may send alerts or other information regarding vehicles to computing device 110 via text message, email, pre-recorded message, or another technique.

Computing device 110 may be a mobile computing device (e.g., a cellular phone, a smart phone, a tablet, a laptop computer, a smart watch) a stationary computing device (e.g., a personal computer, a cloud computer, a supercomputer), or any other computing device. Computing device may receive alerts or other information regarding vehicles from home base 104. Further, computing device 110 may be used by an operator to control system 100, e.g., commanding it to initiate an action such as performing a vehicle inspection or gathering vehicle data. Computing device 110 thus may act as an operator interface to system 100. Computing device may be owned or possessed by a driver of the vehicle, a lot chief, and/or various vehicle maintenance personnel. Although one computing device 110 is depicted in FIG. 1, embodiments are not so limited. Various embodiments may send alerts or other information to any number of computing devices. Further, embodiments may send different alerts and/or information to different computing devices, and allow different computing devices to perform different system commands, e.g., based on the role of the possessor of the respective computing devices.

Figure 2:
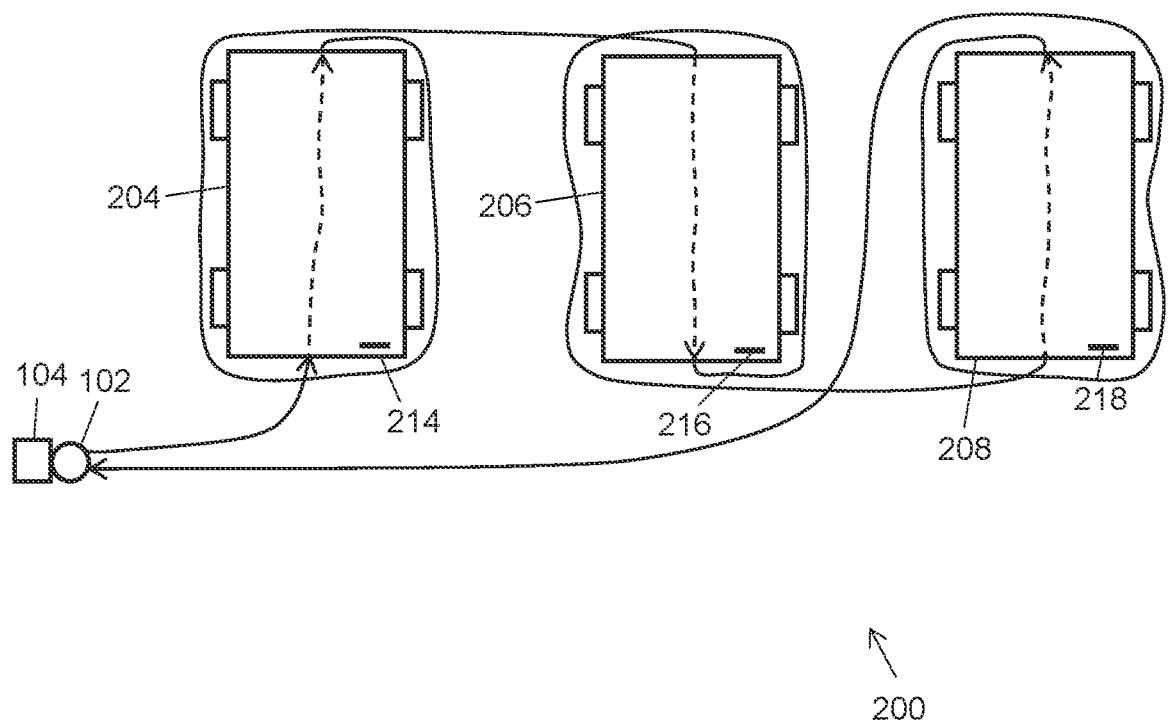
FIG. 2 is a traversal diagram of a robot in a robotic vehicular inspection system according to various embodiments.

FIG. 2 is a traversal diagram 200 of a robot 102 in a robotic vehicular inspection system according to various embodiments. In particular, FIG. 2 depicts a possible path of robot 102 (described above in reference to FIG. 1) in a vehicle lot as it inspects vehicles 204, 206, 208. When not inspecting vehicles, robot 102 may be stationed at home base 104 (described above in reference to FIG. 1). Upon initialization of an inspection action, robot 104 may automatically traverse the vehicle lot to inspect the vehicles (e.g., vehicles 204, 206, 208) located thereon. Robot 102 may have an internal map that indicates locations in the lot that might contain vehicles; that is, robot 102 may have an internal map that depicts the locations of parking spaces within the lot. Robot 102 may use such a map to successively navigate to each such parking space and gather information regarding any vehicle that may happen to be present therein.

As robot 102 approaches each vehicle, it may acquire a visual image of the vehicle and navigate with respect to at least the vehicle, as opposed to navigating solely with respect to its internal map. That is, robot 102 may include pattern recognition software that allows it to process the images of vehicles that it acquires and use such images to navigate to various locations proximate to the vehicle, where it may capture images and/or other data.

Further, as robot 102 approaches each vehicle, it may acquire an identification (e.g., serial number) thereof. Robot 102 may do so by any of a variety of techniques. According to some embodiments, robot 102 uses a camera to capture an image of the license plates 214, 216, 218, of vehicles 204, 206, 208, respectively. Robot 102 may use internal optical character recognition (OCR) software to identify the characters thereon. Alternately, or in addition, each vehicle may have a computer-readable image affixed thereto that robot 102 can capture and interpret as a vehicle identification. Such a computer readable image may be implemented as, for example, a barcode or a QR code that encodes an identification for the vehicle. Alternately, or in addition, each vehicle may have a computer-readable device affixed thereto. Such as device may be implemented as an RFID tag, for example. Such an RFID tag may encode information for the vehicle, including an identification. It such embodiments, robot 102 may be equipped with an RFID reader. Regardless of the particular implementation by which robot 102 acquires the vehicle identification, the item encoding or otherwise representing the vehicle identification may be affixed to or otherwise located on the vehicle in a standardized location, such as the right top of the rear bumper. Alternately, according to some embodiments, robot 102 identifies vehicles according to their unique physical characteristics. Such embodiments may thus associate a vehicle with a unique "fingerprint".

Robot 102 may traverse under and around the perimeter of each vehicle in the lot. Thus, robot 102 may be dimensioned to easily pass under a vehicle while avoiding collisions with any part to the vehicle's undercarriage or drive train. Further, robot 102 may be dimensioned so as to be able to pass between a vehicle's wheels, from the side of the vehicle between its axles, from the front or back of the vehicle between the vehicle's same-axle wheels, or both. Robot 102 may traverse under a vehicle first before circling the vehicles, as shown, or may circle the vehicles prior to passing underneath.

As described in detail herein, robot 102 may capture images, sensor readings, and/or other vehicle data during the traversal proximate to the vehicle, including while robot 102 is under the vehicle. For example, robot 102 may capture one or more images of any vehicle system visible to robot 102 from under or next to the vehicle. Such a vehicle system may include, by way of non-limiting examples, drive train, undercarriage, suspension, exhaust system, engine, oil pan, brake cables, transmission, wheels, tires, fenders, grill, starter motor, grease fittings, panels, doors, side windows, windshield, and back window. As another example, robot 102 may capture images of the surface under the vehicle, e.g., to inspect for fluid leaks or other issues. Such images may be captured for areas known to have potential issues, such as directly under the oil pan. Any images captured by robot 102, whether of the ground or of the vehicle, may be captured in the visible spectrum, infrared spectrum, or ultraviolet spectrum.

Other sensor data that robot 102 may capture include the following. Robot 102 may capture temperature data for any portion of the vehicle, the surrounding environment, or the ground. Robot 102 may capture ambient air pressure. Robot 102 may capture chemical readings, such as ambient or localized levels of gasoline vapor, diesel vapor, naphtha vapor, water vapor (humidity), carbon monoxide, and/or carbon dioxide.

Robot 102 may gather information regarding multiple (e.g., all) vehicles present in the lot. Robot 102 may thus include a list of vehicles that are expected to be present on the lot. The list may be a dynamic list; that is, it may indicate which vehicles are present at which time. Further, the list may be correlated with the internal map in embodiments in which robot 102 is so equipped. In such embodiments, the robot may note when a vehicle is absent from the lot or in an unexpected location and include such information in an alert. Robot 102 may thus traverse all potential vehicle locations, e.g., based on its internal map, and note any unexpected or absent vehicles. According to some embodiments, robot 102 may also locate and identify vehicles without an internal map of vehicle locations.

Upon completion of its traversal of the lot, robot 102 may automatically return to home base 104. There, robot 102 may recharge and/or upload data. To recharge, home base 104 may be equipped with any of a variety of charging mechanisms. According to some embodiments, robot 102 is inductively charged by home base 104, e.g., by way of a charging mat on which robot 102 rests while present at home base 104. According to some embodiments, robot 102 includes electrical contacts configured to electrically interface with conjugate contacts present on the home base. Such contacts may be positioned proximate to magnets present on one or both of robot 102 and home base 104. When robot 102 approaches home base 104, the magnets may attract, such that electrical connections are completed between robot 102 and home base 104. Such electrical connections may be used to deliver charge to robot 102. Further, such electrical connections may be used to upload data collected by robot 102 from robot 102 to home base 104 and/or back end system 106. Yet further, such electrical connections may be used to download program instructions or other data to robot 102. Alternately, or in addition, robot 102 may communicate with its home base wirelessly, e.g., via Wi-Fi and/or Bluetooth, to upload its collected data or other information and download instructions or other information.

Figure 3:
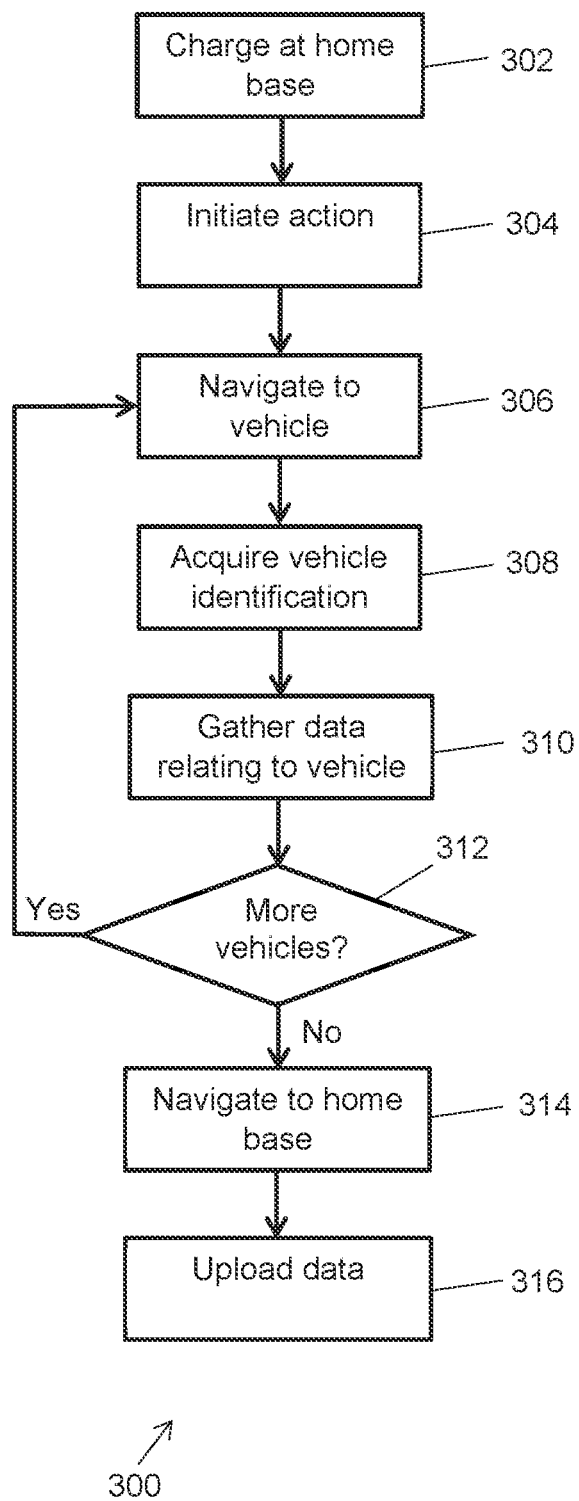
FIG. 3 is flowchart of a method of robotic vehicular inspection from a robot's perspective according to various embodiments.

FIG. 3 is flowchart of a method 300 of robotic vehicular inspection from a robot's perspective according to various embodiments. Method 300 may be practiced using system 100 of FIG. 1. Further, method 300 may include a traversal such as that shown and described above with respect to FIG. 2. Method 300 may be used to gather information from one or more vehicles in a vehicle lot. Subsequently, method 400 as shown and described in reference to FIG. 4 may be used to analyze such information, send one or more alerts, and/or perform any operations as appropriate and as described in detail herein.

At 302, method 300 includes one or more robots, configured as robot 102, each present at a home base, such as home base 104. That is, method 300 may begin at the default condition of robot 102 being stationed at home base 104. Robot 102 may be fully charged at the beginning of method 300.

At 304, an action is initiated to have robot 102 perform some function with respect to the vehicles in its lot, e.g., vehicles 204, 206, 208. Any of a variety of actions may be initiated in any of a variety of ways.

For example, the action initiated at 304 may include a full inspection of one or more vehicles present in the lot, a partial inspection of one or more specified vehicles present in the lot, or any other information gathering with respect to one or more specified vehicles present in the lot. A full inspection of a vehicle may include robot 102 gathering data regarding all items in a list of inspection functions kept at robot 102, home base 104, and/or back end system 106. A partial inspection of a vehicle may include robot 102 gathering data regarding one or more items in such a list. Other information gathering functions that may be initiated per 304 include gathering information not present on the list.

Further examples of actions include the following. The action may include gathering values of a particular vehicle parameter for a plurality of vehicles. The action may include determining whether a particular portion of a particular vehicle has changed. The action may include gathering particular sensor data from one of a plurality of vehicles. The action may include checking vehicles for one or more problems identified in other vehicles from past data gathering actions. Other actions not limited to those described herein are possible.

The action may be initiated at 304 by any of a variety of mechanisms. The action may be initiated by the system itself or by an operator thereof. According to some embodiments, the action may be initiated on a periodic basis, e.g., twice (or more) per day, every day, every other day, every week, every month, or every set number of days, where the set number may be any number between two and 31 inclusive. Such periodic actions may be initiated by the system itself upon proper programming by an operator. According to some embodiments, the action may be initiated by an operator of the system or by another individual. The action may be initiated by a person by providing a command to computing device 110, which may pass an instruction to home base 104 and/or robot 102 to perform some action. The action may be initiated by the system or an operator noticing a problem in a portion of a fleet of vehicles and subsequently further checking another portion of the fleet for the same problem. The action may be initiated from computing device 110, home base 104, or back end system 106.

At 306, robot 102 navigates to a vehicle. Robot 102 may utilize an internal map of the vehicle lot, as described above with respect to FIG. 1, to navigate to the vehicle. As part of block 306, robot 102 may navigate to the vehicle from home base 104 or from a prior vehicle, e.g., on a list of vehicles to navigate to.

At 308, robot 102 acquires an identification of the vehicle to which it navigated. Robot 102 may utilize techniques described above in reference to FIG. 2 to do so.

At 310, robot 102 gathers data relating to the particular vehicle. The data may be any of a variety of data regarding the vehicle and/or its environment. Such data may include, as described above in reference to FIG. 2, an image of a portion of the vehicle or its environment (e.g., under the vehicle) captured in visible light, infrared, and/or ultraviolet, temperature data for any portion of the vehicle, the surrounding environment, or the ground, chemical readings (e.g., ambient or localized levels of gasoline vapor, diesel vapor, naphtha vapor, water vapor, carbon monoxide, and/or carbon dioxide), and/or ambient air pressure. Any other data relating to the vehicle may also be gathered, e.g., for a specified time period (e.g., a 24 hours) or since the last inspection of the vehicle, such as: the distance travelled, vehicle surface path travelled, fuel consumed, fuel economy, driver identity, start/stop times of day, and any data gathered or maintained by any internal computer of the vehicle, such as a Global Positioning System (GPS) computer and/or a vehicle telemetrics computer.

At 312, method 300 determines whether robot 102 is to navigate to any additional vehicles. Robot 102 and/or home base 104 may keep track of the vehicles that robot 102 has navigated to in an internal list. Further, robot 102 and/or home base 104 may keep a list of vehicles to which robot 102 is to navigate in order to complete the action initiated at 304. By comparing the lists, robot 102 may determine whether additional vehicles remain to be navigated to. If so, the control reverts back to 306. If not, then control passes to 314.

At 314, robot 102 navigates back to home base 104. Robot 102 may utilize its internal map to do so. Further, robot 102 may utilize image recognition to home in on home base 104 once it is close enough to capture an image thereof using its camera. Robot 102 may successfully dock at home base 104 and begin to recharge.

At 314, robot 102 uploads its collected data regarding the vehicles that to which it has navigated to home base 104. Robot 102 may utilize a wireless (e.g., Wi-Fi and/or Bluetooth) or wired link to do so. Example techniques for establishing a wired link between robot 102 and home base 104 are described above in reference to FIGS. 1 and 2. Subsequently, home base 104 passes the uploaded data to back end system 106. According to some embodiments, robot 102 uploads data directly to back end system 106, e.g., via a Wi-Fi link, without passing it through home base 106.

Once the data is uploaded to back end system 106, method 300 may conclude, to be followed by method 400 according to various embodiments.

Figure 4:
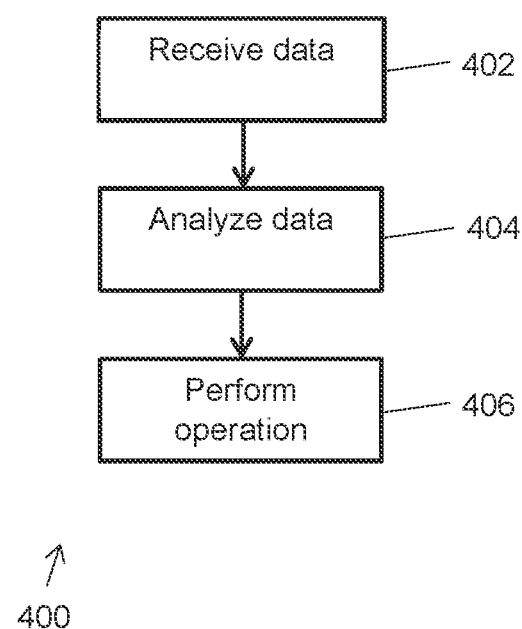
FIG. 4 is flowchart of a method of robotic vehicular inspection from a back end system perspective according to various embodiments.

FIG. 4 is flowchart of a method 400 of robotic vehicular inspection from a back end system's perspective according to various embodiments. Method 400 may be practiced using system 100 of FIG. 1, e.g., by back end system 106. Method 400 may be used to analyze information obtained by method 300, send one or more alerts as appropriate and as described in detail herein, and/or perform a different operation.

At 402, back end system 106 receives data from home base 106 (and/or directly from robot 102) regarding one or more vehicles. Back end system 106 may receive such data via the internet according to various embodiments.

At 404, back end system 106 analyzes the received data to toward determining whether any operation should be performed. Any of a large variety of analyses may be performed.

A first category of analyses concerns comparing images in order to detect an actual or potential problem. Such a comparison may be between one or more comparison images and one or more vehicle images. The comparison images may represent, for example, a baseline or normal condition, or they may represent a fault or abnormal condition. The vehicle images, obtained per 210 of method 300, may represent images regarding a vehicle undergoing the inspection process that are to be checked against the comparison images. The vehicle images may thus include an image of a vehicle portion or its environment (e.g., visible light, infrared, ultraviolet). The comparison images may be any images that represent a normal (e.g., baseline) or abnormal (e.g., fault) condition. Thus, the comparison images may be obtained from any of a variety of sources. Examples of suitable comparison data include prior images of that particular vehicle (or portions thereof), images of similar vehicles (e.g., vehicles in the same fleet that are of the same make, model, and/or year), and images generated from blueprints or Computer Aided Drawing (CAD) files. In particular, comparison images that include images of similar vehicles (e.g., from the same fleet and of the same make, model, and/or year) that have all been diagnosed with the same (or similar) abnormality may be obtained from prior inspections using the system.

A particular example of this first category of analyses is determining vehicle leaks. Such leaks may include leaks of fuel, brake fluid, transmission fluid, oil, coolant, wiper fluid, or any other vehicular fluid. Particular fluid leaks may be generally associated with particular areas under the vehicle, e.g., oil leaks may be typically located under the engine. Thus, the vehicle images and comparison images may be of patches of surface under vehicles in particular locations relative to the vehicles. Patches of different fluids may correspond to different sets of images. The images may be taken in visible light, infrared light, or ultraviolet light, depending in part as to whether a particular spectrum portion benefits a particular fluid identification.

Another particular example of this first category of analyses is determining part drift in a vehicle. According to such examples, a part in a particular vehicle, which may be newly installed or pre-existing, is analyzed to determine whether it has moved beyond a threshold amount. Thus, the comparison images may be of the part (and possibly a portion of its surrounding environment) in the particular vehicle, and the vehicle images may be of the same part (and possibly a portion of its surrounding environment) at a later point in time. According to some embodiments, an operator may place a mark on the part to assist with determining whether it has moved. For example, the mark may be from a grease pencil (or other suitable marking implement) that crosses the part at issue and passes onto another part. Separation of the mark indicates part location drift. Thus, the comparison images may include depictions of the mark as originally placed, and the vehicle images may include depictions of the mark after time has passed.

Another particular example of this first category of analyses is determining whether tire pressure is satisfactory. The comparison and vehicle images may be of tires or of associated vehicle portions. For example, an image of the vehicle's read bumper relative to the underlying lot surface may show parallel lines for properly inflated tires, but angular lines indicating vehicle lean due to improperly inflated tires.

Another example of this first category of analyses is determining whether the vehicle has suffered damage. The comparison images may be of damaged or undamaged vehicle portions (e.g., of vehicles in the same fleet that are of the same make, model, and/or year), depending on whether a match is to indicate damage or not, respectively. The vehicle images may be of a portion of the vehicle under inspection.

Another example of this first category of analyses is determining unknown abnormal conditions. According to this example, the comparison images may be of normal conditions (e.g., for vehicles in the same fleet that are of the same make, model, and/or year). A lack of a match with vehicle images indicates that the vehicle is observably different from similar vehicles. Such a difference may indicate an unknown issue with the vehicle under inspection, which may be damage of a type not covered by the example set forth immediately above. After one or more previously unknown abnormal conditions are determined and identified, e.g., by an operator, images thereof may be used as comparison images for future inspections.

Techniques for performing the comparison for this first category of analyses are many and varied. According to some embodiments, the comparison between images or portions thereof may be accomplished through image registration and image difference detection. In such a process, one of the images (e.g., a vehicle-undergoing-inspection image) may be first registered to another of the images (e.g., a comparison image) using known image registration techniques. The differences between the images may be determined (with or without preceding registration) using any of a variety of image comparison metrics, such as mean square error, comparison using a delta histogram, or feature extraction. If the difference metric exceeds a threshold value, then the comparison is said to be a match. According to other embodiments, the comparison between images or portions thereof may be accomplished using a trained machine learning classifier. Such a trained machine learning classifier may be any of: a support vector machine, a neural network (e.g., a shallow neural network, a deep neural network, a convolutional neural network), a logistic regression classifier, a naive Bayes classifier, a nearest neighbor classifier, a random forest classifier, or a decision tree classifier. Such classifiers may be trained using the comparison images and then subsequently applied to the vehicle images to obtain a classification (e.g., match or no match). Depending on the comparison images, a match (or lack thereof) may indicate either a normal or an abnormal condition.

A second category of analyses concerns comparing data readings (not limited to the above-described images) in order to detect potential or actual problems. Such a comparison may be between comparison data and vehicle data. The comparison data may represent either a baseline (e.g., normal) condition a fault (e.g., abnormal) condition. The vehicle data, obtained per 210 of method 300, may represent data regarding a vehicle undergoing the inspection process that is to be checked against the comparison data. Thus, the vehicle data may include any of: temperature data for any portion of the vehicle, temperature data for the surrounding environment or the ground, chemical readings (e.g., ambient or localized levels of gasoline vapor, diesel vapor, naphtha vapor, water vapor, carbon monoxide, and/or carbon dioxide), and/or ambient air pressure. The comparison data may be obtained from prior data from that particular vehicle, data from similar vehicles (e.g., vehicles in the same fleet that are of the same make, model, and/or year), and data scraped from vehicle or vehicle part documentation and specifications. In particular, the comparison data may include data from similar vehicles (e.g., from the same fleet and of the same make, model, and/or year) that have all been diagnosed with the same (or similar) abnormality. Techniques for performing the comparison for this second category of analyses generally include computing a difference between data values and determining whether it exceeds a threshold.

A third category of analyses concerns fleet inspections in general. Under this type of analysis, a determination may be made as to whether any vehicles are missing from the vehicle lot or otherwise unaccounted for. To perform this type of analysis, the robot's internal list of the vehicles it has encountered in a particular traversal (or particular time period) is compared to the list of the vehicles that should be present (e.g., for a particular time period). Any missing vehicles may trigger an alert.

At 406, method 400 performs an operation according to the analysis made at 404. Depending on the conclusion of the analysis performed at 402, various operations may be triggered. In general, the operations may include reporting operations and/or vehicle adjustment operations.

Reporting operations include sending reports to any of a variety of entities, e.g., via computing device 110. The reports may include information representing the vehicle(s) present in the lot (e.g., a vehicle inventory), vehicle(s) with potential or actual problems, vehicle location(s), the issue(s) identified by the analysis, the time of the analysis and/or vehicle inspection, and/or any other relevant information. For vehicles with potential or actual problems, the report may include a severity level, which may indicate a timeframe for repairs (e.g., Level 1: address ASAP, Level 2: address within 24 hours, Level 3: address within a week, etc.). The reports may be sent to any, or any combination, of: the most recent driver, the next scheduled driver, maintenance personnel, a vehicle lot chief, or any other person or electronic entity such as an email account or spreadsheet.

Reporting may include determining that more than a threshold number of vehicles in a fleet suffer from the same problem. Individual reports may be sent for each such vehicle, and a summary report may be sent once the threshold number is reached. In response, vehicle maintenance personnel may inspect the remaining vehicles for the same issue, or may direct the system to inspect the remaining vehicles for the same issue.

Vehicle adjustment operations include displaying an alert within the vehicle (e.g., on a vehicle computer), shutting down the vehicle, preventing the vehicle from starting, preventing the vehicle from travelling more than a specified distance or at a specified speed, and/or setting or resetting any internal vehicle parameters, such as engine parameters. Similar operations include preventing the vehicle lot gate from opening.

Note that in general, functional operations of robot 102, home base 102, back end system 106, and computing device 110 may overlap, be exchanged, or be integrated. For example, in some embodiments, some image recognition capability may be present in robot 102. In such embodiments, robot 102 may determine that a potential problem exists and conduct a more thorough inspection of the relevant vehicle portion. As another example, home base 104 may be outfitted with an interface that permits an operator to initiate actions or receive reports. Other examples are possible, not limited to those explicitly described herein.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A system for inspecting a vehicle, the system comprising:
   a home base configured to be situated on a vehicle lot;
   a robot having a vertical dimension that permits the robot to pass under a vehicle on the vehicle lot, the robot comprising at least one sensor, the robot configured to perform actions comprising:
   receiving charging at the home base;
   traversing a distance from the home base to a vehicle present on the vehicle lot;
   determining an identification of the vehicle;
   passing under the vehicle; and
   obtaining sensor data regarding the vehicle; and
   a back end system computer configured to perform operations comprising:
   receiving the identification of the vehicle and the sensor data from the robot;
   analyzing the sensor data based on at least comparison data;
   determining, based on the analyzing, to send an alert regarding the vehicle; and
   sending the alert regarding the vehicle.

2. The system of claim 1, wherein the at least one sensor comprises at least one of: a camera, a carbon monoxide sensor, a naphtha sensor, a diesel sensor, or a gasoline sensor.

3. The system of claim 1, wherein the at least one sensor comprises at least one camera, wherein at least one camera is configured to capture at least one image of a ground surface beneath the vehicle, and wherein the sensor data comprises at least one image of a ground surface beneath the vehicle.

4. The system of claim 1, wherein the at least one sensor comprises at least one camera, wherein at least one camera is configured to capture at least one image of an underside portion of the vehicle, and wherein the sensor data comprises at least one image of an underside portion of the vehicle.

5. The system of claim 1, wherein the comparison data comprises at least one prior image of at least a portion of the vehicle.

6. The system of claim 1, wherein the comparison data comprises at least one image of at least a portion of another vehicle.

7. The system of claim 1, wherein the comparison data comprises data derived from at least one technical drawing.

8. The system of claim 1, wherein the analyzing comprises submitting the sensor data to a machine learning classifier trained using at least the comparison data.

9. The system of claim 1, wherein the comparison data comprises data regarding the vehicle, and wherein the analyzing comprises detecting a change between the comparison data and the sensor data beyond a predetermined change tolerance.

10. The system of claim 1, wherein the obtaining sensor data regarding the vehicle comprises obtaining sensor data regarding a portion of the vehicle that has been identified as potentially having an issue based on robotic analysis of a plurality of vehicles of a same type as the vehicle.

11. The system of claim 1, wherein the robot is further configured to retrieve vehicle data from an onboard computer of the vehicle, and wherein the back end system computer is further configured to receive the vehicle data from the robot.

12. The system of claim 1, wherein the sensor data comprises at least one of temperature data, emissions data, self-diagnostic data, location data, start data, stop data, video feed data, lidar data, vehicle geometry data, or fuel economy data.

13. The system of claim 1, wherein the sending the alert comprises at least one of sending a text message or sending an email.

14. The system of claim 1, wherein the alert comprises the sensor data.

15. The system of claim 1, wherein the robot is further configured to return to the home base.

16. A method of robotically inspecting a vehicle, the method comprising:
   receiving charging, by a robot, at a home base on a vehicle lot, the robot having a vertical dimension that permits the robot to pass under a vehicle on the vehicle lot, the robot comprising at least one sensor;
   traversing a distance, by the robot, from the home base to a vehicle present on the vehicle lot;
   determining, by the robot, an identification of the vehicle;
   passing, by the robot, under the vehicle;
   obtaining, by the robot, sensor data regarding the vehicle;

receiving, by a back end system computer communicatively coupled to the robot and from the robot, the identification of the vehicle and the sensor data;

analyzing, by the back end system computer, the sensor data based on at least comparison data;

determining, by the back end system computer and based on the analyzing, to send an alert regarding the vehicle; and sending the alert regarding the vehicle.

17. The method of claim 16, wherein the at least one sensor comprises at least one of: a camera, a carbon monoxide sensor, a naphtha sensor, a diesel sensor, or a gasoline sensor.

18. The method of claim 16, wherein the at least one sensor comprises at least one camera, wherein at least one camera is configured to capture at least one image of a ground surface beneath the vehicle, and wherein the sensor data comprises at least one image of a ground surface beneath the vehicle.

19. The method of claim 16, wherein the at least one sensor comprises at least one camera, wherein at least one camera is configured to capture at least one image of an underside portion of the vehicle, and wherein the sensor data comprises at least one image of an underside portion of the vehicle.

20. The method of claim 16, wherein the comparison data comprises at least one prior image of at least a portion of the vehicle.

21. The method of claim 16, wherein the comparison data comprises at least one image of at least a portion of another vehicle.

22. The method of claim 16, wherein the comparison data comprises data derived from at least one technical drawing.

23. The method of claim 16, wherein the analyzing comprises submitting the sensor data to a machine learning classifier trained using at least the comparison data.

24. The method of claim 16, wherein the comparison data comprises data regarding the vehicle, and wherein the analyzing comprises detecting a change between the comparison data and the sensor data beyond a predetermined change tolerance.

25. The method of claim 16, wherein the obtaining sensor data regarding the vehicle comprises obtaining sensor data regarding a portion of the vehicle that has been identified as potentially having an issue based on robotic analysis of a plurality of vehicles of a same type as the vehicle.

26. The method of claim 16, further comprising:

retrieving, by the robot, vehicle data from an onboard computer of the vehicle; and receiving, by the back end system computer and from the robot, the vehicle data.

27. The method of claim 16, wherein the sensor data comprises at least one of temperature data, emissions data, self-diagnostic data, location data, start data, stop data, video feed data, lidar data, vehicle geometry data, or fuel economy data.

28. The method of claim 16, wherein the sending the alert comprises at least one of sending a text message or sending an email.

29. The method of claim 16, wherein the alert comprises the sensor data.

30. The method of claim 16, wherein the robot is further configured to return to the home base.

* * * * *